(12) United States Patent
Fabrikant et al.

(10) Patent No.: US 6,277,228 B1
(45) Date of Patent: Aug. 21, 2001

(54) METHOD OF FORMING IDENTIFICATION MARK OR INDICIA ON A PLASTIC SUBSTRATE

(76) Inventors: Marvin Fabrikant; Patricia Fabrikant, both of 5149 Tilden St., NW., Washington, DC (US) 20036

( * ) Notice: Subject to any disclaimer, the term of this patent is extended or adjusted under 35 U.S.C. 154(b) by 712 days.

(21) Appl. No.: 08/618,794

(22) Filed: Mar. 20, 1996

(51) Int. Cl.⁷ ................................................. B31F 53/00
(52) U.S. Cl. ........................ 156/219; 156/209; 156/220; 156/553; 156/581
(58) Field of Search ................................... 156/209, 219, 156/220, 553, 581

(56) References Cited

U.S. PATENT DOCUMENTS

| | | |
|---|---|---|
| 753,740 | 3/1904 | Rockstroh . |
| 1,279,655 | 9/1918 | Choate . |
| 1,300,397 | 4/1919 | Holmstrom . |
| 1,406,538 | 2/1922 | Choate . |
| 2,053,473 | 9/1936 | Gould et al. .......................... 41/7 |
| 2,621,432 | 12/1952 | Willner ................................ 40/135 |
| 2,647,852 | 8/1953 | Franklin .............................. 154/118 |
| 2,688,775 | 9/1954 | Scherer et al. ........................ 18/56 |
| 2,703,047 | 3/1955 | Scherer et al. ........................ 101/8 |
| 2,710,046 * | 6/1955 | Markus et al. ....................... 156/581 |
| 3,465,627 | 9/1969 | Vigneault ............................. 83/171 |
| 3,520,751 * | 7/1970 | Cranfill ............................... 156/220 |
| 3,584,572 | 6/1971 | Apicella ............................... 101/27 |
| 3,629,042 * | 12/1971 | Cranfill ............................... 156/209 |
| 3,847,699 | 11/1974 | Shaw et al. .......................... 156/251 |
| 3,880,270 | 4/1975 | Travis et al. ......................... 197/6.4 |
| 4,014,257 | 3/1977 | Bettenhausen ........................ 101/26 |
| 4,073,671 * | 2/1978 | Licata ................................. 156/219 |
| 4,181,560 | 1/1980 | Maitland ............................. 156/542 |
| 4,184,828 | 1/1980 | Farrell ................................ 425/143 |
| 4,247,361 | 1/1981 | Shaheen .............................. 156/630 |
| 4,365,436 | 12/1982 | Ritchey ............................... 40/615 |
| 4,514,456 | 4/1985 | Deal et al. ........................... 428/204 |
| 4,515,867 | 5/1985 | Bleacher et al. ..................... 428/204 |
| 4,824,715 | 4/1989 | Jackson .............................. 428/172 |
| 5,099,106 | 3/1992 | Biancone ............................ 219/228 |
| 5,273,701 | 12/1993 | Marlin ................................ 264/85 |

FOREIGN PATENT DOCUMENTS

3812991 * 11/1989 (DE) .................................... 156/219

* cited by examiner

Primary Examiner—M. Alexandra Elve
(74) Attorney, Agent, or Firm—Foley & Lardner

(57) ABSTRACT

A method of forming or debossing a permanent identification mark or indicia onto a plastic material, such as a housing of an appliance, which becomes soft or melts when heated to a predetermined temperature, comprises applying a label having an adhesive on one side to the substrate or housing with the adhesive side in contact with the substrate or housing. The label, including the adhesive, also becomes soft, melts, or disintegrates when heated to the predetermined temperature. Then, predetermined portions of the label, which portions form the outline of the permanent mark or indicia, is heated to at least the predetermined temperature. The portions of the substrate or housing corresponding to the predetermined label portions are also heated to the predetermined temperature and melted away to a predetermined depth, leaving a permanent mark or indicia on the substrate or housing, even if the label is forcibly removed. The heating of the label and the substrate or housing can be accomplished by providing a heating device with a debosser, which has the mark or indicia protruding from or embossed from a backing. The embossed mark or indicia, which is heated to at least the predetermined temperature, is penetrated into the substrate or housing through the label to deboss the substrate to the predetermined depth.

9 Claims, 1 Drawing Sheet

METHOD OF FORMING IDENTIFICATION MARK OR INDICIA ON A PLASTIC SUBSTRATE

BACKGROUND

Almost all articles of manufacture include some type of identification, such as source, maker, model no., warnings, etc. In some instances, manufacturing regulations require it. Many different types of labels have been used in the past in this regard, such as less permanent stickers, wired tags, paint, and thin metal (usually aluminum) plates with an embossed or debossed marking attached to the articles using screws, nails, or rivets, etc. Sometimes a marking is engraved, debossed, embossed, or burnt directly onto the articles. For instance, in leather goods, markings are branded directly onto the articles using a hot iron. In this regard, one known type of consumer branding tool was sold in the trade name of BRAN-DET™ by Marketing International Inc., Topeka, Kans., which tool was advertised for branding wood, plastic, leather, and rubber. Labels and markings thus have considerable utility, particularly in the manufacturing industry.

In the past, articles, particularly home appliances and tools, were manufactured using a metal or wood housing. Any of the above noted labels could be used with these types of appliances. But now, more and more appliances are leaning toward housings made from thermoplastics, such as acrylonitrile-butadiene-styrene (ABS), polyvinyl chloride (PVC) and polystyrene. These newer types could also use aforementioned conventional labels. With consumer safety in mind, many appliances need to instruct the consumer of certain hazards associated with its use. Typically in the past, warnings or safety instructions were included in a label affixed to the articles. It would be desirable to make the label as permanent as possible. Glued, screwed, or riveted labels can come off through use or wear. Markings can also be engraved, but the newer materials do not necessarily provide a good result and they can also be difficult to apply.

U.S. Pat. No. 4,365,436 to Richey discloses an alternative method of forming indicia by melting away the top layer of a label while leaving the lower layer visible. While this method may provide a distinctively visible marking, when the label is taken off, it too is removed along with the label.

Consumers are often wary of buying stolen appliances (if bought used) or their own appliances being stolen. It would be desirable for the owner to leave a permanent indicia, such as the owner's name, on the appliance. While the commercial labels can be used for this purpose, the consumers usually do not have access to the necessary tooling, such as a metal stamping tool, rivets, etc. And commercially available labels are not too much different from the label taught by the '436 in that the markings come off along with the label. There is a need for an alternative, efficient, and economic way of permanently marking consumer goods, either commercially or by the end user. The present invention fulfills this need.

SUMMARY

The present invention is drawn to a method of forming or debossing a permanent identification mark or indicia onto a plastic material, such as a housing of an appliance, which housing melts when heated to a predetermined temperature. According to the present invention, a label having an adhesive on one side is applied to the substrate or housing with the adhesive side in contact with the substrate or housing. The label, including the adhesive, also melts when heated to the predetermined temperature. The adhesive is preferably of the type that permanently adheres the label to the substrate or housing.

Predetermined portions of the label, which portions form the outline of the permanent mark or indicia, are then heated to at least the predetermined temperature to melt away those portions. The portions of the substrate or housing that have been exposed by the melting of the predetermined label portions are also heated to the predetermined temperature and melted away to a predetermined depth, leaving a permanent mark or indicia debossed into the substrate or housing. Thus, even if one were to forcibly remove the label, the mark or indicia remains with the substrate or housing.

According to one aspect of the present invention, the heating of the label and the substrate or housing can be accomplished by providing a heating device with a debosser, which has the mark or indicia protruding from or embossed from a backing. The embossed mark or indicia, which is heated to at least the predetermined temperature, is penetrated into the substrate or housing through the label to melt away the predetermined label portions and, consequently, the exposed substrate portions to the predetermined depth. Thus, the melting of the predetermined label portions and the exposed substrate portions takes place substantially simultaneously or continuously consecutively.

A highly visible identification mark or indicia can be formed according to the present invention by selecting the color of the label to contrast the mark or indicia.

The label preferably consists essentially of a commercially available polyester film, such as MYLAR® and MELINEX®, and a commercially available general purpose label backing adhesive.

BRIEF DESCRIPTION OF THE DRAWINGS

These and other features, aspects, and advantages of the present invention will become much more apparent from the following description, appended claims, and accompanying drawings where:

DETAILED DESCRIPTION

Figure 1:
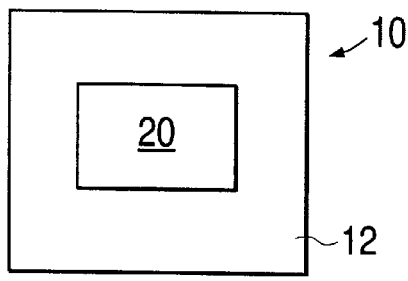
FIG. 1 shows a schematic view of an appliance with a label attached using an adhesive.
Figure 2:
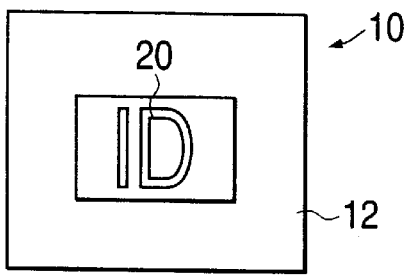
FIG. 2 is similar to FIG. 1, with the label formed with indicia according to the present invention.
Figure 3:
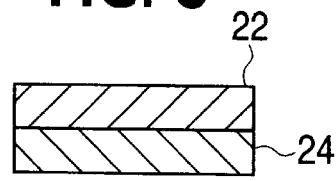
FIG. 3 is a cross-sectional view of the label.

FIG. 1 shows a schematic view of an appliance 10 with a plastic housing, such as a television, stereo, video machine, etc., with a label 20 affixed to a planar, flat surface 12, which can also be curved. The label 20 shown in FIG. 1 is before an indicia or marking "ID" is formed. FIG. 2 shows the label after an indicia "ID" is formed, which indicia is formed through the label 20. Typically, the appliance housings are formed of thermoplastics, such as ABS, PVC, or polystyrene, which become fluid, rubbery like when heated past their glass transition temperature (Tg) and become viscous liquids above their melting point (Tm).

The label 20 consists essentially of a top layer 22 of polymer film and a bottom layer 24 of a thin adhesive film that permanently adheres to the plastic housing and the top layer. Although the top layer 22 can have any desired thickness, it is preferable to be thin. The top layer can be colored for contrasting effect. At least the top layer 22 is formed of a material that can either stretch, become soft, melt, or otherwise disintegrate at the applied temperature, which is preferably between the glass transition temperature Tg and the melting temperature Tg (inclusive) of the plastic housing 12. Preferably, for best results, at least the top layer 22 should not be heat sensitive and it should be resistant to heat shrinkage or expansion and not be heat conductive so that the applied heat remains localized to the applied areas to cleanly affect only the areas outlining the indicia. Many different commercially available materials can be used. An example of materials that can be used as a top layer is a commercially available thin polyester film, such as MYLAR® and MELINEX®, typically having about 1 to 2 mil in thickness. The adhesive film is preferably of the label backing type for polyester film, such as a commercially available adhesives available from 3M®, model Nos. 9667 and 9671. Preferably, the label has a color different from that of the housing to provide highly visible contrast. In this regard the top layer itself can be colored or the adhesive itself can have the color if the top layer is transparent.

Figure 4:
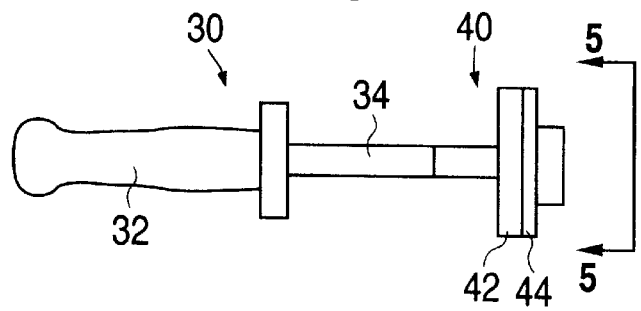
FIG. 4 is a side view of a heating device with a debosser.
Figure 5:
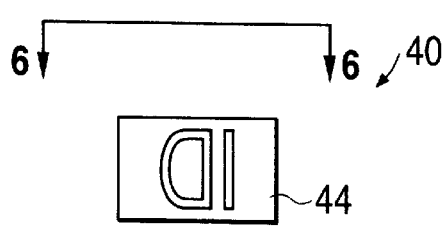
FIG. 5 is a planar front view of the debosser viewed from line 5—5 of FIG. 4.
Figure 6:
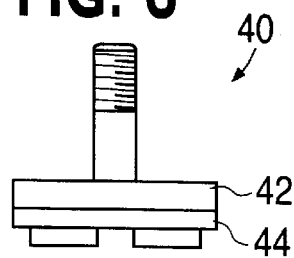
FIG. 6 is a planar top view of the debosser viewed from line 6—6 of FIG. 5.

FIGS. 4–6 show an exemplary heating device 30 that can be used to carry out the present invention. The heating device comprises an insulating handle 32 connected to a heat generating element 34. A debosser 40 having the desired indicia "ID" is threaded into the heat generating element. Commercially available heating devices, such as soldering irons, guns, wood brandishing tools (such as the aforementioned BRAND-DET™ tool), available in varying powers, can be used. Typically, the heat generating element is made of a highly resistive element or an open-flame (torch). Like a typical soldering tip of a soldering device, the debosser is threaded into the distal end of the heat generating element. Through heat conduction, the temperature of the debosser is heated. Alternatively, the debosser itself can be formed of a heat generating element.

The debosser 40 has a desired indicia, "ID", such as mirror imaged names and addresses, serial number, manufacturer, retailer, etc., embossed or raised on a flat heat conductive plate 42. The embossed characters have a predetermined height, which determines the penetration depth of the debossment. These characters can have a TEFLON® coating or the like to prevent sticking. To prevent the areas without the characters from melting, the debosser preferably has a heat shield 44 with appropriate areas cut-out for the indicia characters. The heat shield should have non-heat conductive, insulative characteristics, such as glass fiber, mica, NOMEX®. As previously explained, the plate 42 itself can be formed of the heat generating element. Alternatively, the embossed indicia itself can be formed of the heat generating element, which in that case the plate 42 would be the heat-shield, non-heat conductive.

In operation, the label 20 of a desired size is first attached to a planar surface 12 of a plastic substrate, such as an appliance housing 10, which becomes soft or viscous when heated to a predetermined temperature, between its Tg and Tm. The label also becomes soft, stretches, melts, or disintegrate when heated to the predetermined temperature. Using the heating device 30 with the debosser 40 having the desired indicia embossed thereon, the embossed indicia is squarely moved toward the label after the embossed indicia is heated between Tg and Tm of the substrate or housing. The debosser is pressed into the label until the flat heat shield 44 contacts the label, whereupon the heat from the desired indicia has stretched or melted or disintegrated through the label and carved into (debossed) the substrate to the predetermined depth. The heat shield protects the rest of the label from the heat and also acts as a penetration depth stop. In this regard, the penetration depth can be controlled by varying the thickness of the heat shield, i.e., thicker the heat shield shallower the debossment. As the indicia is debossed into the substrate, even is the label if forcibly removed from the substrate, a permanently debossed indicia is left on the substrate. To highlight the debossment, the label can have a different color, serving as a background color against the foreground substrate color. For instance, if the substrate is black, the label can be white or other light color so that the black indicia becomes strikingly visible against the white background.

Given the disclosure of the present invention, one versed in the art would readily appreciate the fact that there may be other embodiments and modifications well within the scope and spirit of the present invention. Accordingly, all expedient modifications readily attainable by one versed in the art from the present disclosure within the scope and spirit of the present invention are to be included as further embodiments of the present invention. The scope of the present invention accordingly is to be defined as set forth in the appended claims.

What is claimed is:

1. A method of forming a permanent identification indicia on a substrate that melts when heated to a predetermined temperature, comprising:

providing a label having an adhesive on one side, wherein the label, including the adhesive, also melts when heated to the predetermined temperature;

applying the label to the substrate with the adhesive side in contact with the substrate, wherein the adhesive is of the type that permanently adheres the label to the substrate;

heating predetermined portions of the label, which portions define an outline of the indicia, to at least the predetermined temperature to melt the predetermined label portions;

heating portions of the substrate, which portions corresponding to the predetermined label portions, to at least the predetermined temperature and debossing the substrate portions to a predetermined depth, leaving the indicia permanently on the substrate, wherein the debossed substrate portions are exposed through the label.

2. A method according to claim 1, wherein the label has a different color than the substrate so that the label serves as a background of the indicia.

3. A method according to claim 2, wherein the label consists essentially of a polyester film and the adhesive on one side of the film.

4. A method according to claim 1, wherein the substrate is a plastic housing of an appliance.

5. A method according to claim 1, wherein the step of heating the label and the substrate comprises providing a heating device with a debosser having the indicia protruding from from a backing and penetrating the indicia into the substrate through the label to deboss the substrate portions to the predetermined depth.

6. A method of debossing a permanent identification mark on a plastic housing of an appliance, which plastic housing melts when heated to a predetermined temperature, comprising:

providing a label having an adhesive on one side, wherein the label and the adhesive also melt when heated to the predetermined temperature;

applying the label to the housing with the adhesive side in contact with the housing, wherein the adhesive is of the type that permanently adheres to the housing;

heating predetermined portions of the label, which portions define an outline of the identification mark, to at least the predetermined temperature to melt the predetermined label portions;

heating portions of the housing, which portions have been exposed by the melting of the predetermined label portions to at least the predetermined temperature and melting the exposed housing portions to a predetermined depth, leaving the identification mark permanently on the substrate, wherein the debossed portions are exposed through the label.

7. A method according to claim 6, wherein the label has a different color than the housing so that the label serves as a background of the debossed identification mark.

8. A method according to claim 7, wherein the label consists essentially of a polyester film and the adhesive on one side of the film.

9. A method according to claim 6, wherein the step of heating the label and the housing comprises providing a heating device with a debosser having the mark protruding from or embossed from a backing and penetrating the embossed mark into the housing through the label to melt away the predetermined label portions and the exposed housing portions to the predetermined depth, wherein the melting of the predetermined label portions and the exposed housing portions takes place substantially simultaneously.

* * * * *